United States Patent
Fauqueux et al.

(10) Patent No.: US 8,359,138 B2
(45) Date of Patent: Jan. 22, 2013

(54) METHOD AND SYSTEM FOR ASSISTING THE STEERING OF STEERED WHEELS OF A VEHICLE THUS EQUIPPED

(75) Inventors: Olivier Fauqueux, Poissy (FR); Jannick Auvinet, Evreux (FR)

(73) Assignee: Renault S.A.S., Boulogne Billancourt (FR)

(*) Notice: Subject to any disclaimer, the term of this patent is extended or adjusted under 35 U.S.C. 154(b) by 1392 days.

(21) Appl. No.: 10/587,970

(22) PCT Filed: Feb. 4, 2005

(86) PCT No.: PCT/FR2005/050069
§ 371 (c)(1),
(2), (4) Date: Apr. 27, 2007

(87) PCT Pub. No.: WO2005/075277
PCT Pub. Date: Aug. 18, 2005

(65) Prior Publication Data
US 2007/0299585 A1    Dec. 27, 2007

(30) Foreign Application Priority Data
Feb. 6, 2004    (FR) .................................... 04 01180

(51) Int. Cl.
*B62D 5/00* (2006.01)
*B62D 6/00* (2006.01)
(52) U.S. Cl. .............. 701/44; 701/42; 701/41; 180/443; 180/446
(58) Field of Classification Search ................. 180/412, 180/446, 6.44, 402, 6.2, 443; 701/41, 42, 701/44
See application file for complete search history.

(56) References Cited

U.S. PATENT DOCUMENTS

| | | | | |
|---|---|---|---|---|
| 4,979,114 | A * | 12/1990 | Oshita et al. | 701/41 |
| 6,134,490 | A * | 10/2000 | Ito et al. | 701/42 |
| 6,360,151 | B1 * | 3/2002 | Suzuki et al. | 701/41 |
| 6,450,287 | B1 * | 9/2002 | Kurishige et al. | 180/446 |
| 6,594,568 | B2 * | 7/2003 | Matsuoka | 701/41 |
| 2002/0043423 | A1 * | 4/2002 | Endo et al. | 180/446 |
| 2002/0125063 | A1 * | 9/2002 | Kurishige et al. | 180/443 |
| 2003/0146041 | A1 * | 8/2003 | Kanda | 180/446 |
| 2003/0217885 | A1 * | 11/2003 | Aoki et al. | 180/446 |
| 2004/0064229 | A1 * | 4/2004 | Stout et al. | 701/44 |
| 2004/0140148 | A1 * | 7/2004 | Nishizaki et al. | 180/443 |
| 2005/0067214 | A1 * | 3/2005 | Tanaka et al. | 180/446 |

FOREIGN PATENT DOCUMENTS

| | | |
|---|---|---|
| DE | 41 20 069 | 1/1992 |
| WO | 03 022648 | 3/2003 |

* cited by examiner

*Primary Examiner* — Christine Behncke
(74) *Attorney, Agent, or Firm* — Oblon, Spivak, McClelland, Maier & Neustadt, L.L.P.

(57) ABSTRACT

A method and system for assisting the steering of steered wheels of a vehicle, in which a phase lead is applied between a steering wheel and a steering rack element to reduce response time of the vehicle to an action performed by the driver on the steering wheel.

8 Claims, 3 Drawing Sheets

METHOD AND SYSTEM FOR ASSISTING THE STEERING OF STEERED WHEELS OF A VEHICLE THUS EQUIPPED

BACKGROUND

The present invention pertains to the field of the steering of land vehicles, in particular of motor vehicles provided with a mechanism of assisted steering or power steering.

Conventionally, motor vehicles are provided with a chassis, a cabin, wheels linked to the chassis by a suspension mechanism with front steered wheels controlled by a steering wheel at the disposal of the driver in the cabin of the vehicle. Between the steering wheel and the ground wheels is provided a steering column rotationally secured to the steering wheel whose lower end is provided with a pinion acting on a rack, making it possible to rotate the ground wheels about a substantially vertical axis, so as to ensure their orientation and the rotation of the chassis of the vehicle.

Such steering mechanisms may be hydraulically or electrically assisted so as to reduce the driver effort, in particular during maneuvers to a halt, for example, a parking maneuver.

More recently, power steering arrangements have appeared comprising a sensor of the angular position of the steering wheel mounted some distance from an actuator acting on the rack as a function of the angular position detected by the sensor to which it is linked by a wire link.

Document U.S. Pat. No. 5,884,724 describes a steering arrangement with variable geardown ratio, with maintaining of a constant geardown ratio for a few instants during a dynamic maneuver so as to avoid disturbance to the driver. The geardown may be small at low speed so as facilitate the maneuvering of the vehicle that one seeks to park.

However, the applicant has realized that a judicious refinement of the steering mechanisms made it possible moreover to increase safety and improve the road holding of the vehicle. Hitherto, the improvement in the road holding of the vehicle was obtained through an increase in the rigidity of the chassis, an improvement of the tires or else better adjustment of the suspension.

Now, the delay time between the action of the driver on the steering wheel and the commencement of the turning of the vehicle is variable from one vehicle to another. In certain driving cases, the delay time may be prejudicial, or even dangerous. During an avoidance maneuver at average speed, a driver with average training will give an abrupt tug on the steering wheel of large amplitude. The amplitude given by the driver is increased if the driver feels that the vehicle is not turning immediately. At this moment, the vehicle begins to turn and may deviate significantly from the trajectory desired by the driver who reacts by counter-steering so as to put the vehicle back on line. The counter-steering of the driver may again be excessive. The de-phasing may be dangerous at that moment by rendering the vehicle unstable through a phenomenon of antinomy between the tugs on the steering wheel and the response of the vehicle.

BRIEF SUMMARY

The invention aims to improve the dynamic characteristics of the vehicle through a refined steering mechanism.

The method of assisting the steering of steered wheels of a vehicle, according to an aspect of the invention, comprises the application of a phase advance between a steering wheel and a rack element so as to decrease the response time of the vehicle to an action of the driver of the vehicle on said steering wheel. Specifically, hitherto, the response time of a vehicle to an action on the steering wheel was imposed by the elastic kinematics of the running gear and the drift of the tires. The response time resulted from a compromise between course holding, angular dynamics and transient vehicle liveliness. Thus, the response time may be characterized by the delay between a tug on the steering wheel given by the driver and the commencement of the turning of the vehicle, stated otherwise, the yaw rate.

The invention makes it possible to reduce the response time so as to allow smarter avoidance maneuvers able to increase safety.

In an embodiment of the invention, the speed of rotation and the angular acceleration of the steering wheel are measured or estimated and a steered wheels steering preset is emitted as a function of said speed of rotation and angular acceleration. The preset may be formulated by a control unit receiving as input said speed of rotation and angular acceleration.

In an embodiment of the invention, the speed of rotation and the angular acceleration of the steering wheel are compared with predetermined thresholds, a phase advance being applied in case of overshoot of said thresholds. The steering preset can be calculated on the basis of the speed of rotation of the steering wheel, the angular acceleration of the steering wheel and of a temporal advance. The temporal advance may lie between 10 and 100 milliseconds, preferably between 40 and 70 milliseconds, for example around 60 milliseconds.

In another embodiment of the invention, the phase advance is calculated on the basis of the angle of steer of the steered wheels and of a temporal advance. The temporal advance may be calculated on the basis of the angle of the steering wheel. The phase advance may be equal to the sum of the product of the temporal advance times the speed of rotation and of the half-product of the square of the temporal advance times the angular acceleration.

The relation between the angle of the rack pinion and the angle of the steering wheel depends on the geardown which may be variable. The geardown ratio may be broken down into a static gain corresponding to the geardown in a quasi-static situation and a phase corresponding to additional elastic kinematics on the steering column. To the delay due to this phase is added the response time of the chassis. The response time of the chassis is imposed by the mechanics of the running gear. On the contrary, the response time between the steering wheel and the pinion is modified by application of a negative phase, so that the overall response time is less than the response time due to the mechanics of the running gear. A phase advance is thus created between the steering wheel and the pinion.

The invention also proposes a system for assisting the steering of steered wheels of a vehicle, comprising a means for applying a phase advance between a steering wheel and a rack element. It is thus possible to decrease the response time of the vehicle to an action of the driver of the vehicle on the steering wheel.

Advantageously, the system comprises a sensor of parameters of rotation of the steering wheel. The sensor may be of optical or magnetic type, for example, of Hall-effect type.

Advantageously, the means for applying a phase advance comprises a control unit receiving as input, parameters of rotation of the steering wheel, and provided with a means of calculation for calculating a phase advance dependent on parameters of rotation of the steering wheel.

Advantageously, the system comprises a control unit able to apply a phase advance as a function of parameters of rotation of the steering wheel and an actuator able to displace the steering rack, in particular in response to an order originating from the control unit.

In an embodiment of the invention, the means for applying a phase advance comprises a means for calculating a temporal advance as a function of angular parameters of the steering wheel, and a means for calculating a steer angle preset as a function of angular parameters of steering of the steered wheels and of the temporal advance. The means for calculating a steer angle preset may comprise a differentiator for calculating the angular speed of steer of the wheels of the vehicle and the angular acceleration of steer of the wheels of the vehicle on the basis of the angular position of steer of the wheels of the vehicle. The means for calculating an angle of steer preset may comprise a calculation element for calculating the angle of steer preset on the basis of the angular position of steer of the wheels of the vehicle, of the angular speed of steer of the wheels of the vehicle, of the angular acceleration of steer of the wheels of the vehicle and of the temporal advance.

In an embodiment of the invention, the means for calculating a temporal advance as a function of angular parameters of the steering wheel comprises a fuzzy logic element for formulating a confidence index and a table for deducing a temporal advance from the confidence index. Furthermore, the means for calculating a temporal advance may comprise a differentiator for calculating the angular speed and the angular acceleration on the basis of the angular position of the steering wheel.

The invention also proposes a vehicle comprising a chassis, at least three land wheels one of which is a steered wheel and a system for assisting the steering of steered wheels of the vehicle provided with a means for applying a phase advance between a steering wheel and a rack element so as to decrease the response time of the vehicle to an action of the driver on the steering wheel.

The vehicle may comprise power steering or else power assisted steering or else hydraulically assisted steering.

A trial has shown that a vehicle equipped with assistance with the steering of the steered wheels was able to negotiate a chicane at a speed of 75 km/h instead of 72 km/h for the same vehicle with no assistance with the steering of the steered wheels. This increase in the speed of travel is manifested in normal driving situations by increased safety making it possible to reduce the number of accidents involving another vehicle, a two-wheeler or a pedestrian.

BRIEF DESCRIPTION OF THE DRAWINGS

The present invention will be better understood on reading the detailed description of an embodiment taken by way of wholly non-limiting example and illustrated by the appended drawings, in which.

DETAILED DESCRIPTION

Figure 1:
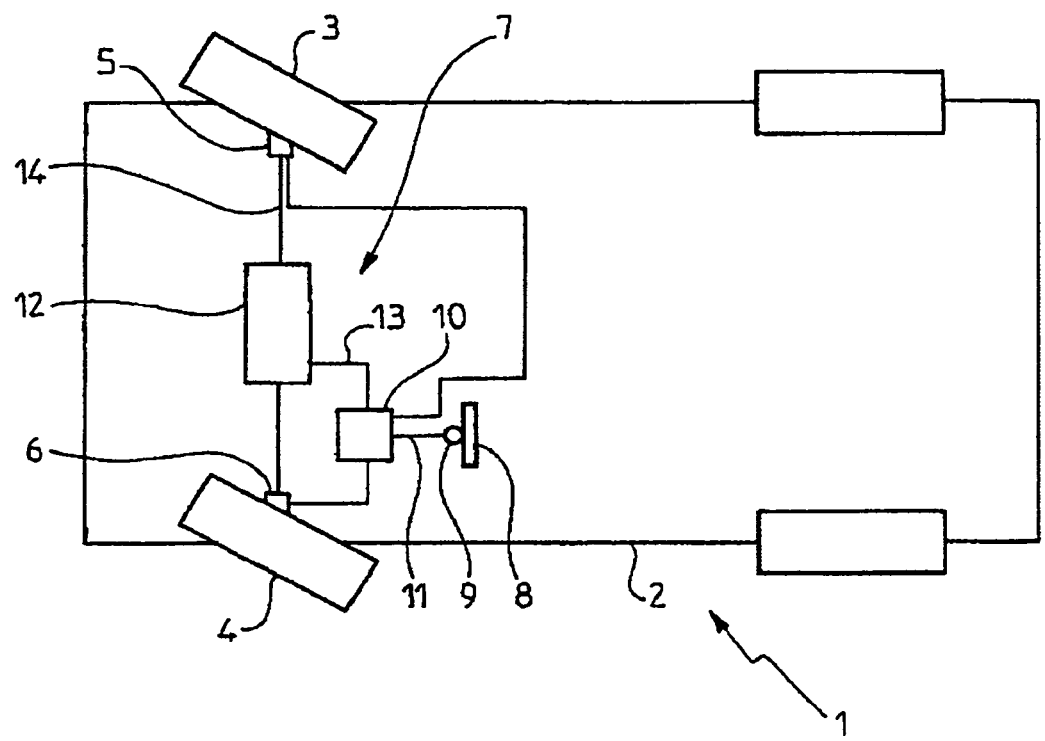
FIG. 1 is a diagrammatic view from above of a vehicle equipped with the steering assistance system according to an aspect of the invention.

As may be seen in FIG. 1, the vehicle 1 comprises a chassis 2, two front steered wheels 3 and 4 and two rear wheels, the wheels being linked to the chassis 2 by a suspension mechanism (not represented). Each front wheel 3, 4 is equipped with a sensor 5, 6 of the angular position of said front wheel 3, 4. The vehicle 1 is supplemented with a steering system 7 comprising a steering wheel 8 disposed in a cabin, not represented, of the vehicle 1, a sensor 9 of the angular position of the steering wheel 8, a central unit 10 linked by a wire link 11 to the sensor 9 for receiving information pertaining to the angular position of the steering wheel 9, an actuator 12 linked by a wire link 13 to the central unit 10 for receiving orders from the central unit 10 and a rack 14 linking the actuator 12 to the steered wheels 3 and 4. The central unit 10 is also linked to the sensors 5 and 6 so as to ascertain the angle of steer $\alpha(t)$ of the front wheels. The angle of steer $\alpha(t)$ may be equal to the average of the angles $\alpha_5(t)$ and $\alpha_6(t)$ measured by the sensors 5 and 6.

The sensor 9 is capable of detecting parameters of rotation of the steering wheel, for example, the angle $\alpha$. The sensor may be of optical or magnetic type, for example, of Hall-effect type, cooperating with a coder angularly secured to the steering column, while the sensor is non-rotating.

The central unit 10 may be embodied in the form of a dedicated circuit, for example, of ASIC type, or of a microcontroller equipped with at least one memory and making it possible, on the basis of the information received from the sensor 9, to calculate the angular speed $\dot{\alpha}$ and the angular acceleration $\ddot{\alpha}$ of the steering wheel 8.

Figure 2:
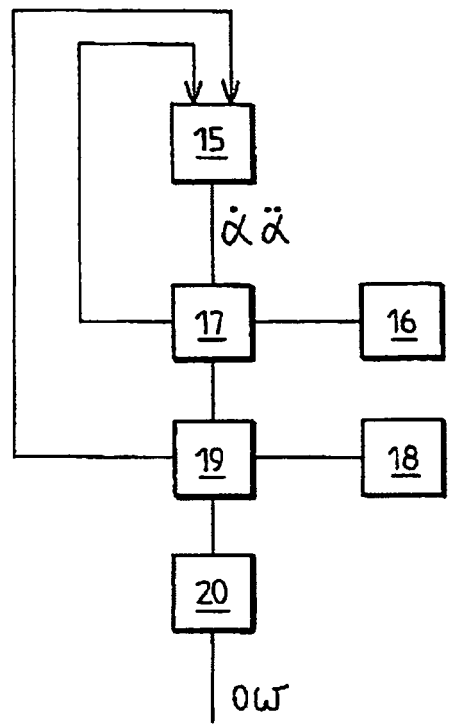
FIG. 2 is a simplified flowchart of the dynamic operation of the vehicle.

As illustrated in FIG. 2, the calculation of the angular speed $\dot{\alpha}$ and of the angular acceleration $\ddot{\alpha}$ of the steering wheel 8 is performed in step 15. In step 16, which may be performed at the same time as step 15, the central unit extracts a speed threshold from the memory and step 17 performs a comparison between the speed threshold and the angular speed $\dot{\alpha}$ calculated in step 15. If the angular speed calculated $\dot{\alpha}$ is less than the threshold, then the central unit repeats step 15. If the angular speed calculated $\dot{\alpha}$ is greater than the threshold, then we go to step 19.

Step 18, which may be performed simultaneously with steps 16 and 17, consists in the central unit taking an angular acceleration threshold from the memory. In step 19, the central unit performs a comparison between the angular acceleration $\ddot{\alpha}$ calculated in step 15 and the acceleration threshold extracted from the memory in step 18. If the angular acceleration a calculated is less than the threshold, then the central unit repeats step 15. Conversely, if the angular acceleration a calculated is greater than the threshold, then the central unit goes to step 20. It will be understood that the order in which steps 17 and 19 are performed may be reversed. In step 20, the central unit performs a calculation of the temporal advance $t_1$ to be applied by the actuator 12 having regard to the overshooting of the two thresholds and of the value of the angular speed $\dot{\alpha}$ and of the angular acceleration $\ddot{\alpha}$. The preset $\alpha_c$ of angle of steer of the wheel may be expressed as follows: $\alpha_c(t) = \alpha(t) + t_1 \dot{\alpha}(t) + t_1^2 \ddot{\alpha}(t)/2$. The preset $\alpha_c$ to be applied is then dispatched to the actuator 12 through the wire link 13. The phase advance $\phi$ expressed in angle units $= \phi = t_1 \dot{\alpha}(t) + t_1^2 \ddot{\alpha}(t)/2$. The temporal advance expressed in time units is $t_1$.

By way of variant, provision may be made for the central unit 10 to be provided with a mapping making it possible to determine a value of phase advance as a function of the angular speed $\dot{\alpha}$ and of the angular acceleration $\ddot{\alpha}$. The mapping then provides for a zero phase advance should the angular speed $\dot{\alpha}$ or angular acceleration $\ddot{\alpha}$ be less than one of said aforementioned thresholds.

Figure 3:
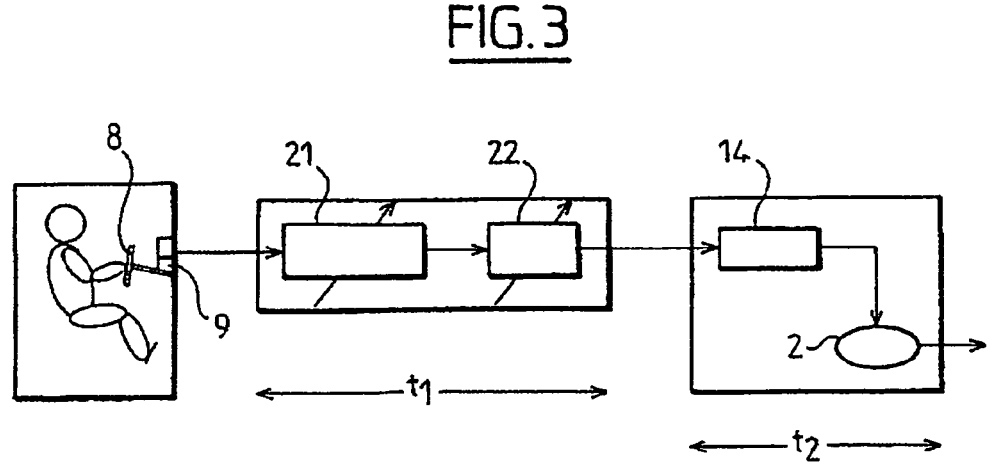
FIG. 3 is a logic diagram of the operation of a vehicle steering arrangement.

Illustrated in FIG. 3 is the manner of operation of a vehicle steering arrangement. A driver acts on a steering wheel 8 provided with a sensor of displacement parameters 9. The link between the steering wheel 8 and the rack 14 is characterized by a gain 21 and a phase 22 manifested by a delay $t_1$ in the case of a conventional steering arrangement. The characteristics of the chassis 2 and of the wheels 3 to 6 are manifested by a delay $t_2$ before the yaw rate of the chassis 2 is modified. The central unit 10 therefore makes it possible to act on the phase 22 by applying a negative phase $t_1$ making it possible to reduce the response time in such a way that the overall response time becomes less than $t_2$.

The advance $t_1$ may be of the order of 60 milliseconds for a vehicle exhibiting a delay $t_2$ of the order of 140 milliseconds. More generally, the advance $t_1$ may lie between 10 and 100 milliseconds, preferably between 40 and 70 milliseconds.

Figure 4:
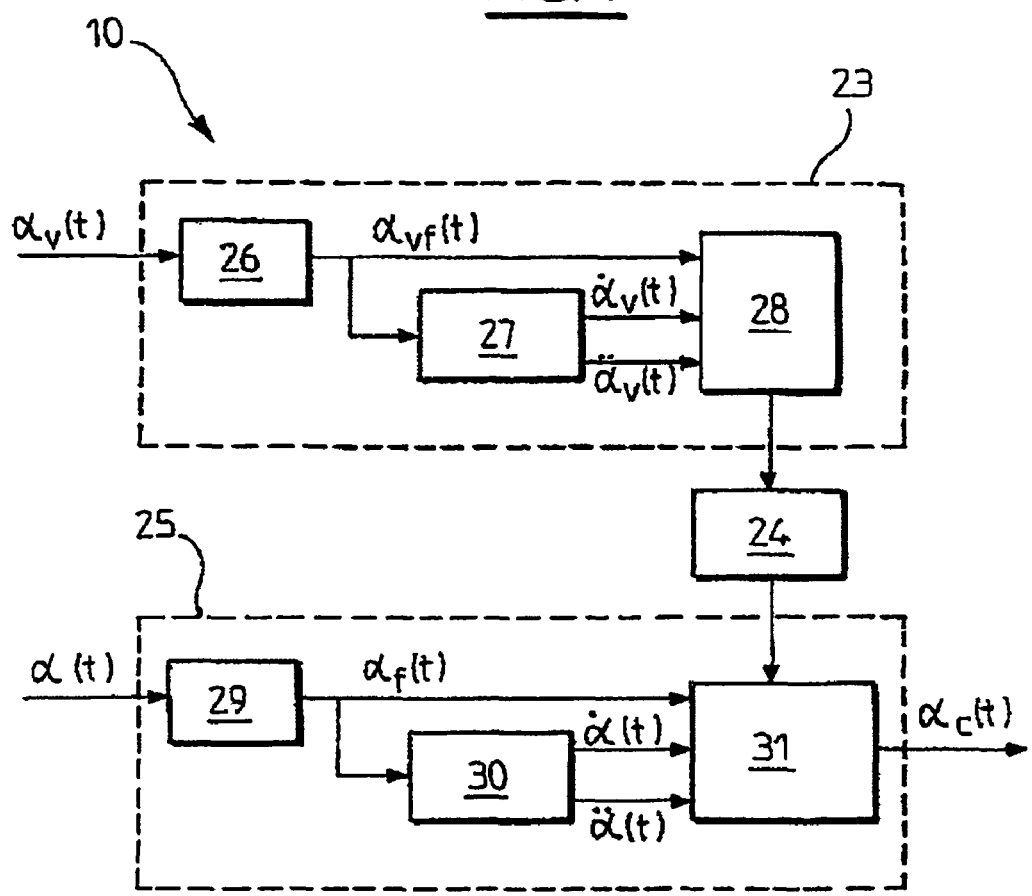
FIG. 4 shows a flowchart according to another embodiment of the invention.

In the embodiment illustrated in FIG. 4, the central unit 10 comprises a situation detection module 23, a table 24 and a module 25 for calculating the preset angle $\alpha_c(t)$. The situation detection module 23 comprises a filter 26, a differentiator 27 and a fuzzy logic element 28. The situation detection module 23 receives as input the steering wheel angle $\alpha_v(t)$ measured by the sensor 9. The filter 26 performs a filtering of the steering wheel angle $\alpha_v(t)$ and provides a filtered steering wheel angle $\alpha_{vf}(t)$ to the differentiator 27, and to the fuzzy logic element 28. The differentiator 27 calculates the angular speed $\dot{\alpha}_v(t)$ and the angular acceleration $\ddot{\alpha}_v(t)$ of the steering wheel. The fuzzy logic element 28 receives the filtered steering wheel angle $\alpha_{vf}(t)$, the angular speed $\dot{\alpha}_v(t)$ and the angular acceleration $\ddot{\alpha}_v(t)$ of the steering wheel, and calculates a situation confidence index $h_u$ output by the situation detection module 23 to the table 24.

The table 24 relates the situation confidence index $h_u$ to a temporal advance $t_1$ output from said table 24 to the module 25 for calculating the preset angle $\alpha_c(t)$. The module 25 receives as input the temporal advance $t_1$ and the angle of steer $\alpha(t)$ of the front wheels.

The module 25 for calculating the preset angle $\alpha_c(t)$ comprises a filter 29, a differentiator 30, and a calculation element 31. The filter 29 performs a filtering of the angle of steer $\alpha(t)$ and provides a filtered angle of steer $\alpha_f(t)$ to the differentiator 30, and to the calculation element 31. The differentiator 30 calculates the angular speed $\dot{\alpha}(t)$ and the angular acceleration $\ddot{\alpha}(t)$ of steer. The calculation element 31 calculates the steer preset angle $\alpha_c(t)=\alpha_f(t)+t_1\dot{\alpha}(t)+t_1^2\ddot{\alpha}(t)/2$.

The fuzzy logic element allows adaptation to various situations, in particular by increasing the number of fuzzy laws and/or of inputs of said element. The value of the temporal advance is therefore adapted to circumstances. Provision may be made to take account of the speed of the vehicle, and of other variables.

The invention therefore makes it possible to improve the behavior of a vehicle when traveling through a chicane. Trials have shown a reduction of more than 30% in drift at the center of gravity of the vehicle and a reduction of the order of 50% in angles of the speeds of rotation of the steering wheel. Thus, the vehicle equipped with the steering assistance is more reactive with reduced amplitudes of angles at the steering wheel and is controlled more readily with lower angles of drift.

The invention applies to lightweight vehicles, to heavyweight trucks including those with multiple steered axles, to three-wheeled vehicles, to civil engineering or agricultural machinery or to tracked machinery.

The invention claimed is:

1. A method of assisting steering of steered wheels of a vehicle, comprising:
    calculating an angular speed and an angular acceleration of a steering wheel of the vehicle;
    comparing the angular speed of the steering wheel to a threshold speed;
    comparing the angular acceleration of the steering wheel to a threshold acceleration; and
    when the angular speed is greater than the threshold speed and the angular acceleration is greater than the threshold acceleration, applying a phase advance between the steering wheel and a rack element so as to decrease a response time of the vehicle to an action of a driver of the vehicle on the steering wheel,
    wherein a steered wheels steering preset is emitted to an actuator to control the rack element, the steering present being calculated as a function of the angular speed and the angular acceleration of the steering wheel, and
    wherein the steering preset is calculated based on an angle of steer of the steered wheels and a temporal advance, according to the following equation:

$$\alpha_c(t)=\alpha(t)+t_1\alpha_1(t)+t_1^2\alpha_2(t)/2,$$

$\alpha_c$ being the steering present, $\alpha$ being an angle of steer of the steering wheel, $t_1$ being the temporal advance, $\alpha_1$ being the angular speed of the steering wheel, and $\alpha_2$ being the angular acceleration of the steering wheel.

2. The method as claimed in claim 1, wherein the temporal advance is calculated based on the angle of steer of the steering wheel.

3. The method as claimed in claim 1, wherein the temporal advance is between 10 and 100 milliseconds.

4. A system for assisting steering of steered wheels of a vehicle, comprising:
    a sensor to measure an angular speed and an angular acceleration of a steering wheel of the vehicle; and
    a control unit to compare the angular speed acceleration of the steering wheel to a threshold acceleration, wherein
    when the angular speed is greater than the threshold speed and the angular acceleration is greater than the threshold acceleration, the control unit applies a phase advance between the steering wheel and a rack element so as to decrease a response time of the vehicle, wherein the response time is a time between an action of a driver on the steering wheel and a commencement of steering of the steered wheels,
    the steered wheels steering preset is emitted to an actuator to control the rack element, the steering preset being calculated as a function of the angular speed and the angular acceleration of the steering wheel, and
    the steering preset is calculated based on an angle of steer of the steered wheels and a temporal advance, according to the following equation:

$$\alpha_c(t)=\alpha(t)+t_1\alpha_1(t)+t_1^2\alpha_2(t)/2,$$

$\alpha_c$ being the steering preset, $\alpha$ being an angle of steer of the steering wheel, $t_1$ being the temporal advance, $\alpha_1$ being the angular seed of the steering wheel, and $\alpha_2$ being the angular acceleration of the steering wheel.

5. The system as claimed in claim 4, wherein the control unit comprises means for calculating the temporal advance as a function of the angular speed and the angular acceleration of the steering wheel.

6. The system as claimed in claim 4, wherein the control unit sets the phase advance equal to zero when the angular speed of the steering wheel is less than the threshold speed or the angular acceleration of the steering wheel is less than the threshold acceleration.

7. The system as claimed in claim 4, wherein the temporal advance is between 10 and 100 milliseconds.

8. The system for assisting steering of steered wheels of a vehicle, comprising:
- a sensor to measure an angular speed and an angular acceleration of a steering wheel of the vehicle; and
- a control unit to compare the angular speed of the steering wheel to a threshold speed and to compare the angular acceleration of the steering wheel to a threshold acceleration, wherein
- when the angular speed is greater than the threshold speed and the angular acceleration is greater than the threshold acceleration, the control unit applies a phase advance between the steering wheel and a rack element so as to decrease a response time of the vehicle, wherein the response time is a time between an action of a driver on the steering wheel and a commencement of steering of the steered wheels, and
- the control unit comprises a fuzzy logic element for formulating a confidence index as a function of the angular speed and the angular acceleration of the steering wheel, and a table for deducing a temporal advance from the confidence index.

* * * * *